United States Patent
Skjelmose et al.

(10) Patent No.: US 12,341,341 B2
(45) Date of Patent: Jun. 24, 2025

(54) FREQUENCY SUPPORT FROM A POWER PLANT WITH AN ELECTRICAL STORAGE UNIT

(71) Applicant: VESTAS WIND SYSTEMS A/S, Aarhus (DK)

(72) Inventors: Mads Rajczyk Skjelmose, Risskov (DK); Kouroush Nayebi, Ikast (DK); Henrik Møller, Egå (DK)

(73) Assignee: VESTAS WIND SYSTEM A/S, Aarhus N (DK)

( * ) Notice: Subject to any disclaimer, the term of this patent is extended or adjusted under 35 U.S.C. 154(b) by 587 days.

(21) Appl. No.: 17/638,718

(22) PCT Filed: Aug. 20, 2020

(86) PCT No.: PCT/DK2020/050237
§ 371 (c)(1),
(2) Date: Feb. 25, 2022

(87) PCT Pub. No.: WO2021/037320
PCT Pub. Date: Mar. 4, 2021

(65) Prior Publication Data
US 2022/0224118 A1    Jul. 14, 2022

(30) Foreign Application Priority Data
Aug. 30, 2019   (DK) .............................. PA 2019 70547

(51) Int. Cl.
*H01M 10/44*    (2006.01)
*H02J 3/00*    (2006.01)
(Continued)

(52) U.S. Cl.
CPC .............. *H02J 3/241* (2020.01); *H02J 3/003* (2020.01); *H02J 3/004* (2020.01); *H02J 3/32* (2013.01);
(Continued)

(58) Field of Classification Search
None
See application file for complete search history.

(56) References Cited

U.S. PATENT DOCUMENTS

| | | | |
|---|---|---|---|
| 2010/0090532 A1 | 4/2010 | Shelton et al. | |
| 2014/0070756 A1* | 3/2014 | Kearns | H02J 13/00034 320/101 |

(Continued)

FOREIGN PATENT DOCUMENTS

| | | | |
|---|---|---|---|
| CN | 10382742 A | 5/2014 | |
| CN | 104285059 A | 1/2015 | |

(Continued)

OTHER PUBLICATIONS

Danish Patent and Trademark Office, 1st Technical Examination Including The Search Report and The Search Opinion for Application PA 2019 70547 dated Feb. 6, 2020.
(Continued)

*Primary Examiner* — Arun C Williams
(74) *Attorney, Agent, or Firm* — Patterson + Sheridan, LLP

(57) ABSTRACT

The invention relates to a method for controlling a power plant for providing frequency support to a power grid. The power plant comprises an electrical storage unit and a power generating system comprising one or more power generating units including at least one wind turbine generator. The method comprises setting a frequency control period, wherein the electrical storage unit is scheduled to charge or discharge according to a first power set-point and at the start of the frequency control period, charging or discharging the electrical storage unit according to the power set-point. In case of a frequency deviation, a power change of the power from the electrical storage unit is determined based on the frequency deviation. Frequency support is provided by controlling the electrical storage unit to charge or discharge according to a second power set-point determined from the power change.

10 Claims, 5 Drawing Sheets

(51) Int. Cl.
    *H02J 3/24*         (2006.01)
    *H02J 3/32*         (2006.01)
    *H02J 7/00*         (2006.01)
    *H02J 7/04*         (2006.01)

(52) U.S. Cl.
    CPC .......... *H02J 7/0048* (2020.01); *H02J 7/0071* (2020.01); *H02J 7/04* (2013.01); *H02J 2300/28* (2020.01); *H02J 2300/40* (2020.01)

(56) References Cited

U.S. PATENT DOCUMENTS

| | | |
|---|---|---|
| 2014/0316592 A1 | 10/2014 | Haj-Maharsi et al. |
| 2015/0105923 A1 | 4/2015 | Beekmann |
| 2015/0137519 A1 | 5/2015 | Tarnowski |
| 2016/0268802 A1 | 9/2016 | Shim |
| 2018/0062389 A1 | 3/2018 | Hashimoto |

FOREIGN PATENT DOCUMENTS

| | | |
|---|---|---|
| CN | 109416020 A | 3/2019 |
| EP | 2139090 A1 | 12/2009 |
| EP | 3188337 A1 | 7/2017 |
| JP | 2007060742 A | 3/2007 |
| WO | 2021037320 A1 | 3/2021 |

OTHER PUBLICATIONS

PCT, Notification of Transmittal of The International Search Report and The Written Opinion of The International Searching Authority, or The Declaration for Application PCT/DK2020/050237 dated Oct. 21, 2020.

First Office Action received for Chinese Patent Application No. 20200060238.7, mailed on Jan. 27, 2025, 21 pages (6 pages of English Translation and 6 pages of Original Document).

* cited by examiner

FREQUENCY SUPPORT FROM A POWER PLANT WITH AN ELECTRICAL STORAGE UNIT

FIELD OF THE INVENTION

The invention relates to control of power plants, particularly power plants which has one or more wind turbines and to controlling energy storage systems of the power plant, particularly for providing frequency support of the power grid.

BACKGROUND OF THE INVENTION

Electronic storage units such as battery energy storage systems can be used to supplement the power production from power plants such as renewable power plants, e.g. wind turbine power plants. Similarly, the battery energy storage systems can store excess power production from the power plant. The capability of the energy storage systems to store and deliver power, can be used for supporting grid frequency deviations by storing or suppling power from/to the power grid when the grid frequency deviates from an allowed frequency range.

EP 2 921 698A1 discloses a system for automatic generation control in a wind farm. The system includes a wind farm controller for controlling the plurality of energy storage elements. The wind farm controller receives an automatic generation control set point from an independent system operator, generates a farm-level storage power set point for the wind farm based on the automatic generation control set point, generates individual storage power set points for the plurality of energy storage elements based on states of charge of the respective energy storage elements, and controls the plurality of energy storage elements based on the individual storage power set points for dispatching storage power to perform automatic generation control. The wind farm may be controlled to deliver additional power to support a frequency error based on a wind farm power reference.

SUMMARY

It is an object of the invention to improve control of power plants to alleviate one or more of the above mentioned problems, and therefore to provide a method which improves frequency support of the power grid.

In a first aspect of the invention, a method for controlling a power plant for providing frequency support to a power grid is presented, where the power plant comprises an electrical storage unit and a power generating system comprising one or more power generating units including at least one wind turbine generator, where the power generating system is connected to an electrical power grid for supplying power to the electrical power grid, and wherein the electrical storage unit is electrically connected with the power generating system and is controllable to charge or discharge dependent on a power set-point, wherein the method comprises:
  setting a frequency control period, wherein the electrical storage unit is scheduled to charge or discharge according to a first power set-point,
  at a start of the frequency control period, charging or discharging the electrical storage unit according to the first power set-point,
  in case the grid frequency exceeds a first grid frequency located above or below a frequency threshold, resulting in a first frequency deviation within the frequency control period, determining a first power change of the power from the electrical storage unit based on the first frequency deviation,
  determining a second power set-point based on the determined first power change, and
  providing the frequency support by controlling the electrical storage unit to charge or discharge according to the second power set-point.

Advantageously, by scheduling charging and discharging of the electrical storage unit within a predetermined frequency control period, starting charging or discharging according to the first power set-point, it is possible to improve the utilization of the electrical storage system to provide frequency support. That is, with an initial charging in a planned frequency support period, an under frequency situation can be supported by the power capacity of the electrical storage unit, i.e. the capability of the electrical storage unit to provide a change of power supplied to the grid, e.g. by changing from charging power to a discharging power. According to an embodiment, in case the grid frequency exceeds a second grid frequency located above or below the first grid frequency, which results in a second frequency deviation within the frequency control period, a second power change is determined, a third power set-point is determined based on the determined second power change, and frequency support is provided by controlling the electrical storage unit to reverse charging to discharging the electric storage unit, or vice versa, according to the third power set-point.

Advantageously, by reversing the charging direction, a maximum change of the power supplied to the power grid is possible when the electrical storage unit is pre-set to charge or discharge.

According to an embodiment, a maximum value of the second power change is given by the sum of the first power set-point and a nominal charging or discharging power. That is, by reversing the charging direction and initially charging or discharging with the nominal charging or discharging power, the change of the power supplied to the power grid can be maximized to two times the magnitude of the nominal charging or discharging power.

In an embodiment, providing the frequency support is conditioned on a level of a state of charge of the electrical storage unit. Advantageously, the use of the electronic battery to provide frequency support may be prohibited if the state of charge is too high or too low.

In an embodiment, setting the frequency control period comprises
  scheduling the electrical storage unit to charge according to a first power set-point and scheduling the electrical storage unit to discharge within the frequency control period in case the first or second frequency deviation indicates an under frequency of the grid, or
  scheduling the electrical storage unit to discharge according to a first power set-point and scheduling the electrical storage unit to charge within the frequency control period in case the first or second frequency deviation indicates an over frequency of the grid.

Advantageously, by scheduling whether the electronic storage unit should be charged or discharged, e.g. due to a forecasted under or over frequency, it is possible to reverse charging to discharging, or vice versa, and thereby maximizing the change of power that can be supplied to the power grid.

According to an embodiment, the method comprises:
forecasting a period of time wherein the power plant is capable of generating a plant production power which is higher than a planed required plant production power, and
setting the frequency control period within the forecasted period of time, wherein the electrical storage unit is scheduled to charge according to the first power set-point.

Advantageously, the forecasted excess power can be used to charge the electronic storage unit. The forecasted excess power may be used for a scheduled charging with a given power which provides power capacity of the electrical storage unit to support an under frequency event, e.g. changing from a charging power to a discharging power.

According to an embodiment, the method comprises:
forecasting a period of time wherein the power plant is scheduled to generate a plant production power which is lower than a planed required plant production power, and
setting the frequency control period within the forecasted period of time, wherein the electrical storage unit is scheduled to discharge according to the first power set-point.

Advantageously, the forecasted low power situation can be used to discharge the electronic storage unit. The discharging may be used to support an over frequency event, if such event occurs simultaneously or overlap the period of low power.

According to an embodiment, the method comprises supplementing the determined power change with a generator power change of power generated by the power generating system. Advantageously, if the power change which is available from the electronic storage unit is insufficient, a power change generated by the power generating system may supplement the electronic storage unit.

According to an embodiment, the supplementation of the determined power change with the generator power change is invoked in case the electronic storage unit power change is insufficient for achieving the determined power change.

A second aspect of the invention relates to a central controller for controlling a power plant to provide frequency support to a power grid, the power plant comprises an electrical storage unit and a power generating system comprising one or more of power generating units including at least one wind turbine generator, where the power generating system is connected to an electrical power grid for supplying power to the electrical power grid, and wherein the electrical storage unit is electrically connected with the power generating system and is controllable to charge or discharge dependent on a power set-point, and where the central controller is arranged to perform the method according to the first aspect.

A third aspect of the invention relates to a power plant which comprises a plurality of power generating units including at least one wind turbine generator and the central controller according to the second aspect.

A fourth aspect of the invention relates to a computer program product comprising software code adapted to control a power plant when executed on a data processing system, the computer program product being adapted to perform the method of the first aspect.

In general, the various aspects and embodiments of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DETAILED DESCRIPTION OF EMBODIMENTS

Figure 1:
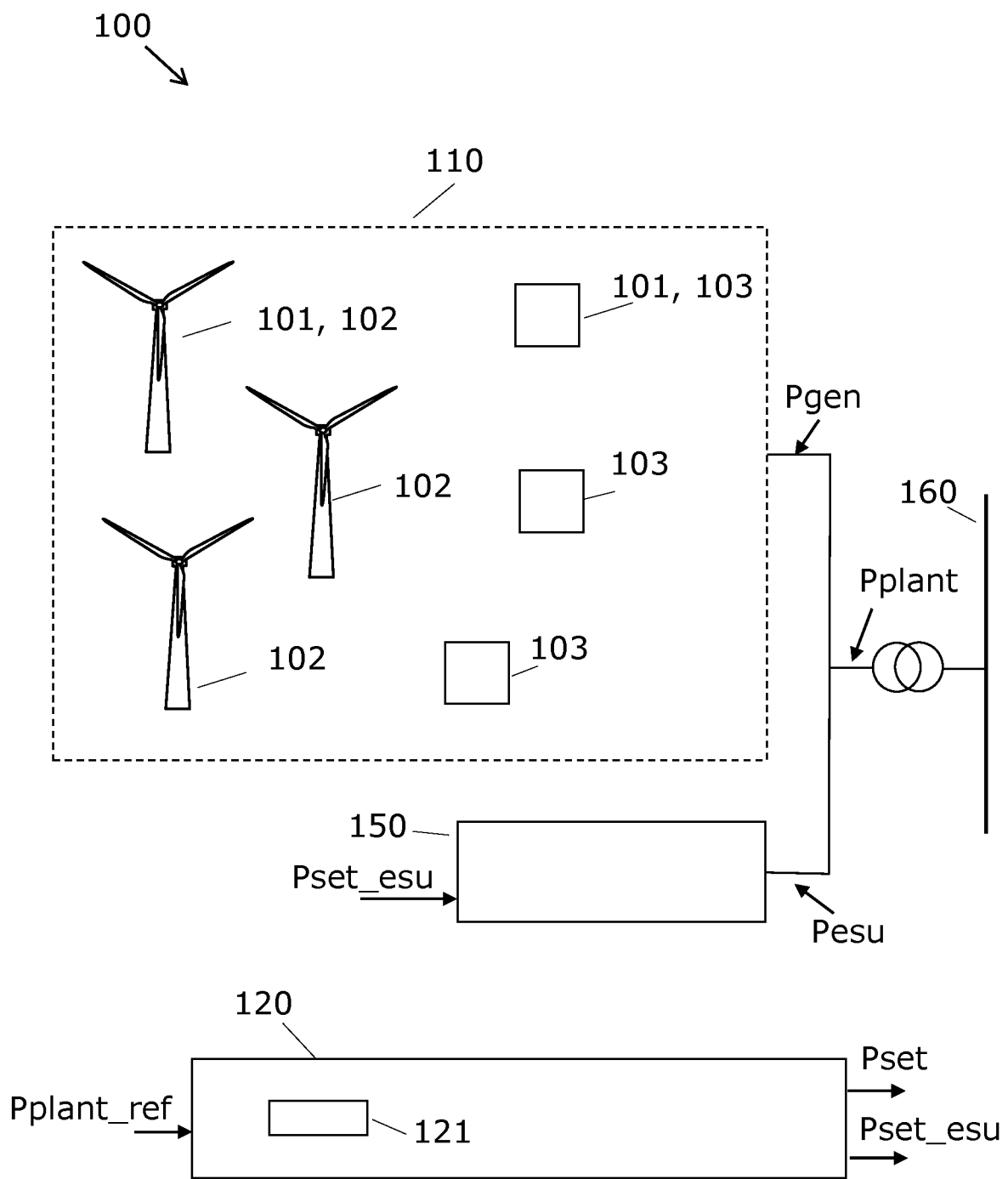
FIG. 1 shows a power plant including an electronic storage unit and a plurality of power generating units and wind turbines.

FIG. 1 shows a power plant 100 which comprises a power generating system 110 comprising one or more of power generating units 101 including at least one wind turbine generator 102. The power plant 100 further comprises an electrical storage unit 150. The power generating system 110 and the electrical storage unit 150 is connected to an electrical power grid 160 for supplying power to the electrical power grid. The electrical storage unit 150 is controllable to charge or discharge dependent on a power set-point Pset_esu.

In general, the power generating units 101 may consist of different types of power generating units, e.g. different types of renewable power generating units such as solar power units 103 (e.g. photovoltaic solar panels) and wind turbines 102. The different types of power generating units 101 may also include fossil based power production units, e.g. diesel engines. According to an embodiment, at least one of the power producing units 101 of the power plant 100 is a wind turbine. The power plant 100 may comprise at least three power generating units 101 of the same or different types, i.e. a mix, of different types of power generating units. For example, the power plant 100 may consist only of wind turbines 102 and in this case at least three wind turbines 102. In another example, the power plant 100 comprises at least two wind turbines 102 and at least one or two other power generating units 101.

The power plant 100 is controlled by a central controller 120. The central controller 120 is arranged to control power generation from the power generating units 101 according to a power plant reference Pplant_ref which defines the desired power to be supplied to the grid from the power plant 100. Furthermore, the central controller 120 is arranged to dispatch power set-points Pset to the power generating units, i.e. individual power set-points to each power generating unit 101 which sets the desired power productions. The power set-points Pset may be determined by the central controller 110 dependent on the power plant reference Pplant_ref so that the sum of power set-points Pset corresponds to the power plant reference Pplant_ref.

Furthermore, the central controller 120 is arranged to determine power set-points Pset_esu to one or more electrical storage units 150 so that a given electrical storage unit 150 can be controllable to charge or discharge with the power set by the power set-point Pset_esu.

Throughout this description, the term power reference is used for the demanded power for the power plant 100, whereas power set-point is used for the demanded power for the individual power generating units 101 and the electrical storage units 150.

The wind turbine generator 102 may comprise a tower and a rotor with at least one rotor blade, such as three blades. The rotor is connected to a nacelle which is mounted on top of the tower and being adapted to drive a generator situated inside the nacelle. The rotor is rotatable by action of the wind. The wind induced rotational energy of the rotor blades is transferred via a shaft to the generator. Thus, the wind turbine is capable of converting kinetic energy of the wind into mechanical energy by means of the rotor blades and, subsequently, into electric power by means of the generator. The generator may include a power converter for converting the generator AC power into a DC power and a power inverter for converting the DC power into an AC power to be injected into the electrical power grid.

The generator of the wind turbine 102, or other power generating unit 101, is controllable to produce power corresponding to the power set-point Pset provided by the central controller 110. For wind turbines, the output power may be adjusted according to the power set-point by adjusting the pitch of the rotor blades or by controlling the power converter to adjust the power production. Similar adjustment possibilities exists for other power generating units 101.

Herein any reference to power such as power plant power Pplant, power set points Pset, produced power Pprod can define active, reactive or apparent power levels.

According to an embodiment, said power levels, such as Pplant, Pset, and Pprod and other related power levels are active power levels.

In an embodiment, a forecasted power Pplant_f that the power plant is capable of producing may be forecasted for a future period of time. The forecasted power Pplant_f may be determined based on current weather and weather forecasts, including wind speed for wind turbines and cloud cover for solar power units, as well as other weather parameters which are relevant for the power production. The power that a wind turbine is able to produce, i.e. the available power, is the maximum possible power output of a wind turbine under the given wind conditions. Thus, the available power will be close to the power output according to the power optimised power curve of a specific turbine. The power curve used herein is understood as the power Coefficient (Cp) optimised power curve for the specific turbine. In other words, the power curve represents the maximum power output of a turbine under normal operation as a function of the wind speed.

The central controller 120 may comprise a frequency-power component 121 arranged to determine the requested power Pplant_req to be delivered to the grid 160 by the power generating units 101 and the electrical storage units 150 according to a frequency-power function, e.g. a function in the form of a curve or look-up table which provides the power request as a function of frequency. Thus, the central controller 120 may be configured to determine the power set-points Pset, Pset_esu for the power generating units 101 and the electrical storage units 150, e.g. by means of the frequency-power component 121. Alternatively, the power plant reference Pplant_ref provided as an input to the central controller 120, may be determined by an external frequency-power component (not shown) via a frequency-power function as described above.

For example, for frequencies in an allowed range from a lower frequency threshold fTL below the nominal frequency fn, e.g. 50 Hz, to a higher frequency threshold fTH above the nominal frequency, the frequency-power component does not affect the power reference or power set-points, i.e. the requested power Pplant_req to be supplied to the grid 160. For frequencies above fTH, the requested power Pplant_req is decreased, e.g. as a function of the frequency to reduce power reference. The decrease of the requested power supports the grid by assisting in decreasing the grid frequency back to the allowed range. Similarly, for frequencies below fTL, the requested power Pplant_req is increased, for supporting the grid to increase the frequency back to the allowed range. For convenience, the lower frequency threshold fTL and the higher frequency threshold fTH are commonly referred to as a frequency threshold fT.

Figure 2:
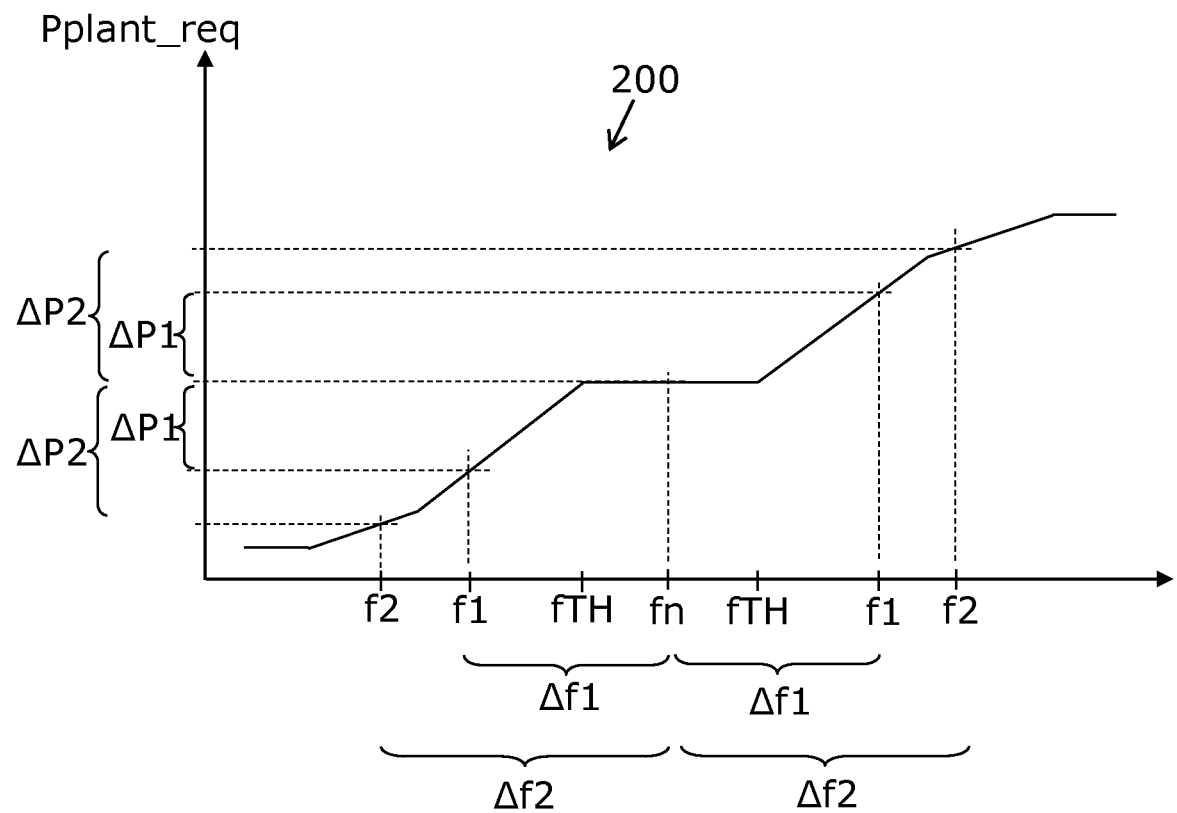
FIG. 2 illustrates an example of frequency-power function.

FIG. 2 illustrates an example of frequency-power function 200 according to the above example. FIG. 2 shows a first frequency deviation $\Delta f1$ relative to the nominal frequency fn due to a first grid frequency f1 exceeding the frequency threshold fT—i.e. the lower or the higher frequency threshold fTL, fTH. The frequency-power function results in a first power change $\Delta P1$ due to the frequency deviation $\Delta f1$. As shown, for a larger second frequency deviations $\Delta f2$ where the grid frequency exceeds a second grid frequency f2 located below or above first grid frequency f1, the requested power Pplant_req may be further increased or decreased (dependent on the sign of the frequency deviation). As shown, a second power change $\Delta P2$ is determined based on the second frequency deviation $\Delta f2$.

Figure 3:
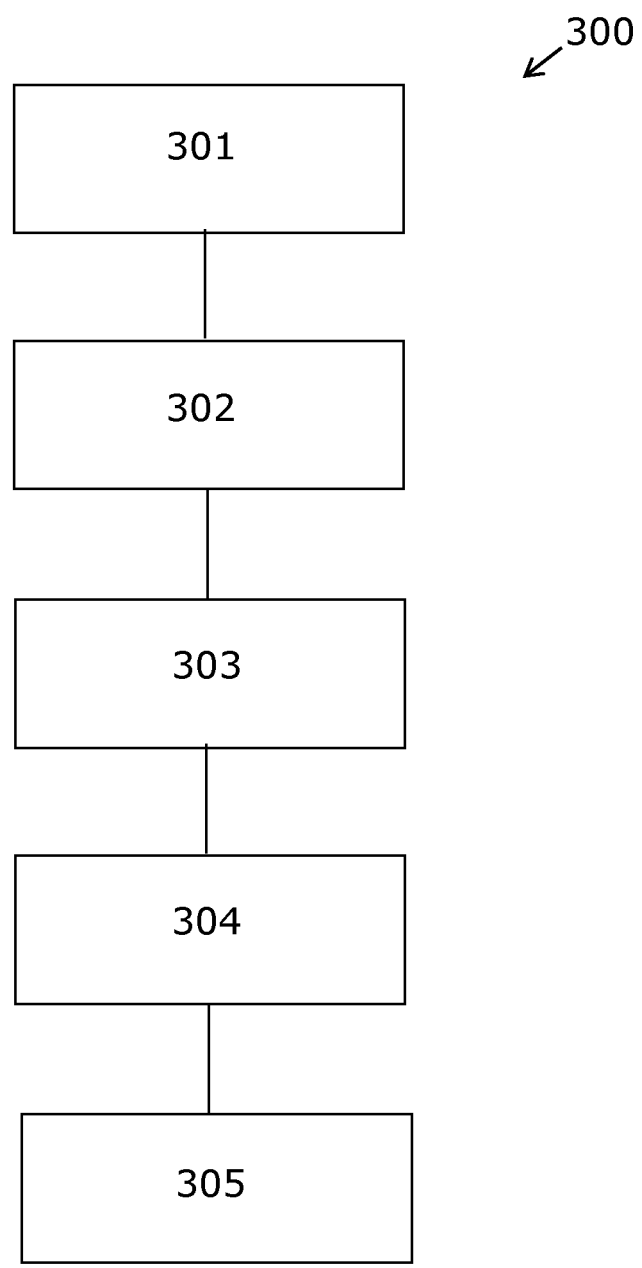
FIG. 3 illustrates the method steps of an embodiment.

FIG. 3 illustrates the method steps of an embodiment.

In step 301, a frequency control period is set wherein the electrical storage unit 150 is scheduled to charge or discharge. The scheduled charging or discharging may be controlled according to a first power set-point Pset_esu1. Accordingly, a feedback control system may be used to limit the error between the desired first power set-point Pset_esu1 and the actual charging or discharging during the frequency control period.

The frequency control period may define different scenarios. For example, the frequency control period may define a period where the power plant 100 is planned to be available for supplying frequency support to the power grid 160, i.e. to be available for increasing or decreasing the power, such as the active power, supplied to the grid 160.

Step 302 is initiated at the start of the frequency control period, wherein the charging or discharging of the electrical storage unit according to the planned first power set-point Pset_esu1 is initiated. It is possible that the first power set-point Pset_esu1 used at start of the frequency control period may be modified corresponding to the planned first power set-point Pset_esu1, e.g. due to changes in the weather conditions.

In step 303, if a frequency deviation $\Delta f1$, $\Delta f2$ occurs within the frequency control period, i.e. if the grid frequency f exceeds a first grid frequency f1 located above or below the respective upper and lower frequency thresholds fTL, fTH, a first change of power $\Delta P1$ from the electrical storage unit 150 is determined based on the first frequency deviation $\Delta f1$.

In step 304, if a first change of power $\Delta P1$ is determined and frequency support is needed, a second power set-point Pset_esu2 is determined based on the first power change $\Delta P1$.

That is, if the required power change $\Delta P1$, i.e. the change of power Pplant to be supplied to the power grid 160, is 400 kW, and if planned first power set-point Pset_esu1 is −500 kW (a negative power set-point for the esu indicates charging), the required power change $\Delta P1$ can be achieved by setting the second power set-point Pset_esu2 to −100 kW, thereby reducing the charging power Pesu.

In an other example, if the required power change ΔP1 is 1000 kW, and if the planned first power set-point Pset_esu1 is −500 kW, the required power change ΔP1 can be achieved by setting the second power set-point Pset_esu2 to 500 kW, thereby changing the charging power of −500 kW to a discharging power of 500 kW. This enables a 1000 kW increase of the power Pplant of the power plant 100.

Thus, the second power set-point Pset_esu2 may led to a reduction in the magnitude of the charging or discharging power, or a change of the initial charging to discharging or vice versa.

The magnitude and sign of the frequency deviation Δf1, Δf2 within a future period may be forecasted, e.g. based on statistics on historical data. The forecasted future period of the frequency deviation may be used to determine a frequency control period. Therefore, in an embodiment, the electrical storage unit may be scheduled to charge or discharge in the frequency control period dependent on the forecast of a frequency deviation Δf1, Δf2, such as the magnitude and sign of the frequency deviation.

Thus, if the forecasted or predicted frequency deviation Δf1,Δf2 indicates an under frequency, an initial charging of the electrical storage unit 150 can be planned within a frequency control period, so that a maximum discharging power can be used for supporting the grid. That is, if the initial charging power is given by Pset_esu1 and the nominal discharging power is Pnom_esu (i.e. the maximum charging power. Herein the nominal charging and discharging power are considered equal and are both referred to as Pnom_esu), the power initially supplied to the grid 160 can be increased rapidly with ΔPgrid=Pnom_esu+Pset_esu1. For example, if the initial charging power is 500 kW, and the nominal discharging power is 500 kW, the power initially supplied to the grid 160 can be increased rapidly with 1000 kW, i.e. twice as much as the initial charging power. The opposite applies if the predicted frequency deviation Δf1,Δf2 indicates an over frequency. Thus, the scheduled charging or discharging enables that the power supplied to the power grid 160 is changed, where the power change is given by the sum of the initial charging or discharging power Pset_esu1 and the nominal discharging or charging power Pnom_esu.

In addition to forecasting frequency deviations, the future plant production power Pplant_f may be predicted, e.g. based on weather forecasts. Thus, a period of time wherein the power plant 100 is capable of generating a plant production power Pplant_f which is higher than a planed required plant production power Pplant_req_f may be forecasted. In this predicted period of time, the additional power that the power plant 100 is able to produce in excess of the planed required plant production power can be used for charging the electrical storage unit 150. Accordingly, the frequency control period may be set dependent on (e.g. within) the forecasted period of time wherein the power plant is capable of producing power in excess to the planed required power, and the electrical storage unit may be scheduled to charge according to the first power set-point Pset_esu1 in frequency control period. If the forecasted period of excess power occurs prior to a period of under frequency of the power grid, or overlaps such a period, the excess charging power may be used to satisfy a determined first or second power change ΔP1, ΔP2, e.g. by reversing the charging power to a discharging power.

Similarly, a period of time wherein the power plant 100 is scheduled to generate a plant production power Pplant_f which is lower than a planed required plant production power Pplant_req_f, e.g. due to a forecasted low available power production of the power generating units 101, the frequency control period may be set within the forecasted period of time of low power production, and the electrical storage unit 150 may be scheduled to discharge according to the first power set-point Pset_esu1 in frequency control period in order to complement the low power production. If this forecasted period of low power occurs prior to a period of over frequency of the power grid, or overlaps such a period, the discharging power may be used to satisfy a determined first or second power change ΔP1, ΔP2, e.g. by reversing the discharging power to a charging power.

In step 305, the electrical storage unit 150 is controlled to charge or discharge according to the second power set-point Pset_esu2 so that the power plant 100 assists in provided frequency support to the power grid 160.

Figure 4:
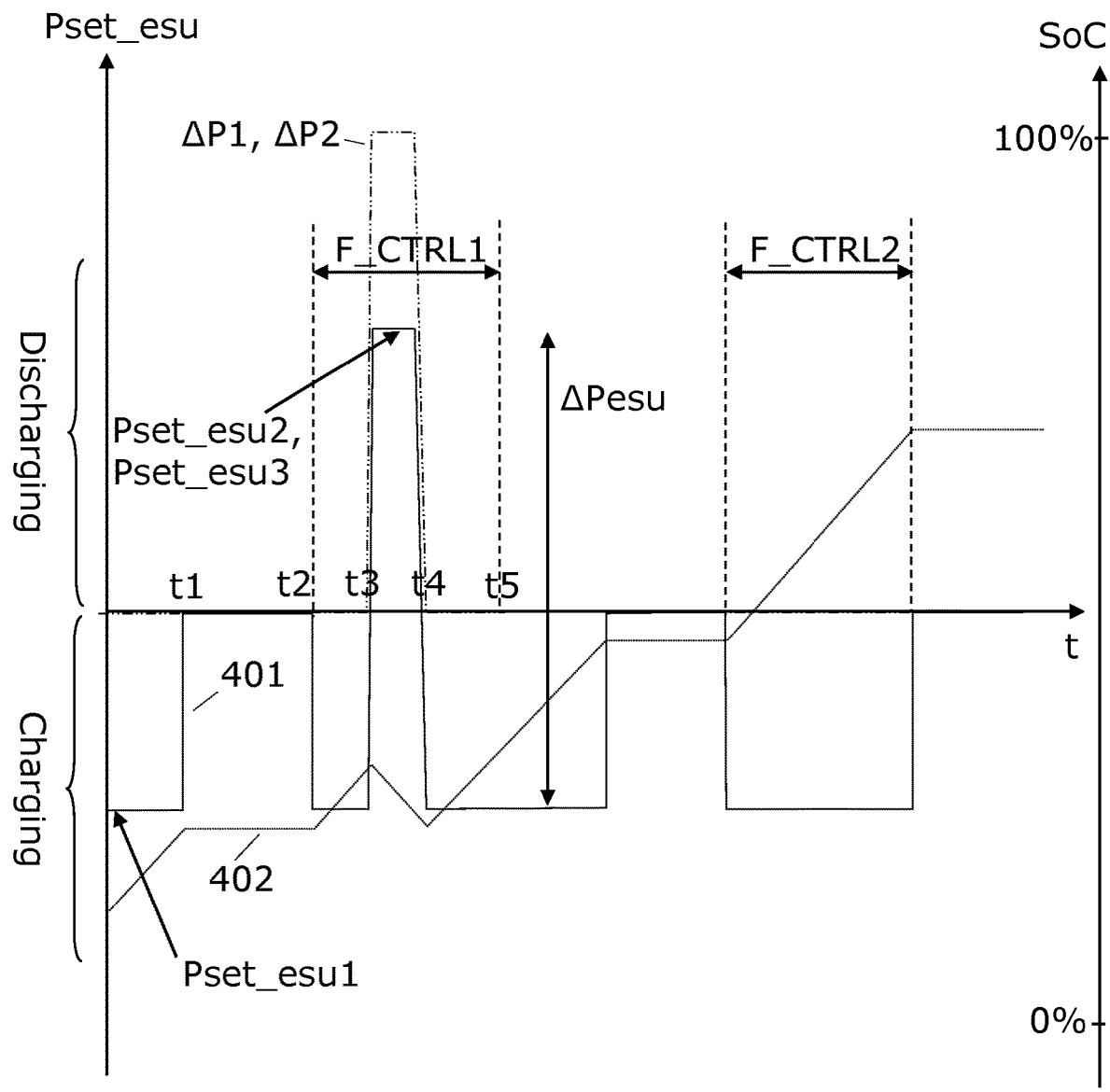
FIG. 4 shows an example where the frequency control period is scheduled for charging and supporting an under frequency event.

FIG. 4 shows an example where the frequency control period F_CTRL is scheduled for charging and where the first frequency control period F_CTRL1 involves frequency support.

Curve 402 shows the state of charge SoC of the electrical storage unit 150 relative the charging level from 0 to 100%. Curve 401 shows the charging and discharging power of the electrical storage unit 150 which corresponds to the power set-point Pset_esu of the electrical storage unit 150, such as the first and second power set-points Pset_esu1, Pset_esu2. The curve labelled ΔP1, ΔP2 shows the power change determined in response to a frequency deviation, such as the first or second frequency deviation Δf1, Δf2.

From t=0 to t1, the electrical storage unit 150 is charged and the state of charge SoC increases. From t1 to t2, there is no charging or discharging. At t2, at the start of the first frequency control period F_CTRL1, an initial charging takes place according to the first power set-point Pset_esu1. At t3, a frequency deviation results in a power change, such as the first or second power change ΔP1, ΔP2. A second or third power set-point Pset_esu2, Pset_esu3 is determined based on the determined power change ΔP1, ΔP2. The determined power change ΔP1, ΔP2 can be achieved by reversing the charging at Pset_esu1 to discharging at Pset_esu2/Pset_esu3. During t3 to t4, the state of charge SoC is reduced. The frequency deviation ends at t4 so that the state of charge increases again. The first frequency control period F_CTRL1 ends at t5. During the second frequency control period F_CTRL2, no frequency deviation takes place and, therefore, charging continues during the second frequency control period.

As can be understood from FIG. 4, a certain level of the state of charge SoC is required in order to enable a change of the charging current direction or magnitude, or equivalently a change of the sign or magnitude of the charging power Pset_esu. Thus, the capability of the electric storage unit 150 to provide frequency support may conditioned on a level of a state of charge SoC of the electrical storage unit. For example, a state of chart SoC of at least 20% may be required in order to provide under frequency support by discharging the electrical storage unit 150 during the frequency deviation. Similarly, a state of charge SoC of at most 80% may be required in order to provide over frequency support by charging the electrical storage unit 150 during the frequency deviation.

FIG. 4 also illustrates an example where the grid frequency f exceeds a second grid frequency f2, which is located above the first grid frequency f1 (cf. FIG. 2). The second frequency deviation Δf2=f2−fn results in a second power change ΔP2 and a third power set-point set_esu3 which can be achieved by reversing the initial charging at the start of the frequency control period F_CTRL1 to discharging according to the third power set-point Pset_esu3.

The first and second grid frequencies f1, f2 are arbitrary frequencies where f1 is merely used as an example where the frequency deviation may not require a reversing of the charging, e.g. from charging to discharging, and where f2 is merely used as an example where the frequency deviation may require a reversing of the charging current. This does not exclude that the first grid frequency f1 would not require a reversing of the charging current, or that the second grid frequency f2 would require a reversing of the charging current. The same analogy applies to the first and second frequency deviations Δf1, Δf2, and the second and third power set-points Pset_esu3, Pset_esu3.

In some cases, the grid compensation power which can be supplied or received by the electrical storage units 150 may be insufficient for satisfying the required power change ΔP, i.e. when the maximum electronic storage unit power change ΔPesu is insufficient for achieving the determined power change ΔP1, ΔP2. For this and other reasons, e.g. saving stored power in the storage units 150 may be prioritized, the desired power change ΔP may be achieved, at least partly, by changing the generator power Pgen from the power generating system 110. Thus, the desired power change ΔP may be achieved by a combination of a generator power change ΔPgen and an electronic storage unit power change ΔPesu. The generator power change ΔPgen may be achieved by e.g. by decreasing or increasing power production from wind turbines 102.

Figure 5:
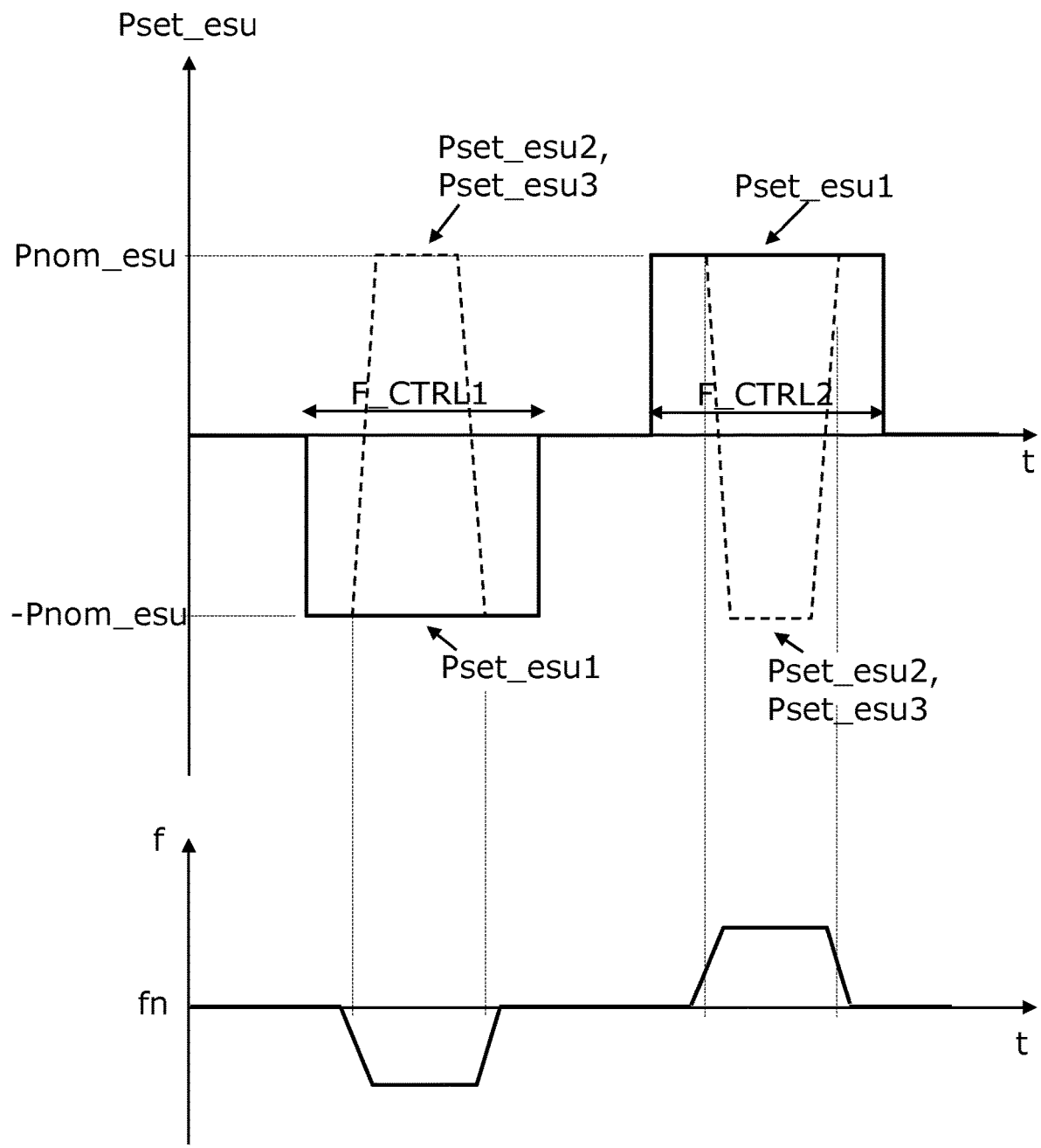
FIG. 5 shows examples of frequency support during different frequency control periods.

FIG. 5 shows an example of frequency support during a first frequency control period F_CTRL1, where the electrical storage unit 150 is pre-set to charge according to the first power set-point Pset_esu1 which is here set to the nominal charging power Pnom_esu. Within the first frequency control period F_CTRL1, an under frequency event occurs, which leads to a new power set-point Pset_esu2. The maximum up-regulation capacity of the electronic storage unit 150 is two times the nominal charging power Pnom_esu, i.e. 2*Pnom_esu. That is, since the first power set-point Pset_esu1 is set to a maximum charging power of −Pnom_esu, the maximal available power increase ΔPesu from the electronic storage unit 150 is 2*Pnom_esu. Accordingly, the power of the power plant Pplant can be increased to Pplant_pre+2*Pnom_esu, where Pplant_pre is the power produced in the frequency control period before the start of the under frequency event.

Similarly, FIG. 5 shows an example of frequency support during a second frequency control period F_CTRL2, where the electrical storage unit 150 is pre-set to discharge according to the first power set-point Pset_esu1. Within the second frequency control period F_CTRL2, an over frequency event occurs, which leads to a new power set-point Pset_esu2. The maximum down-regulation capacity of the electronic storage unit 150 is two times the nominal charging power Pnom_esu, i.e. 2*Pnom_esu. That is, since the first power set-point Pset_esu1 is set to a maximum discharging power of Pnom_esu, the maximal available power increase ΔPesu from the electronic storage unit 150 is 2*Pnom_esu. Accordingly, the power of the power plant Pplant can be decreased to Pplant_pre−2*Pnom_esu.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for controlling a power plant for providing frequency support to a power grid, the power plant comprises an electrical storage unit and a power generating system comprising one or more power generating units including at least one wind turbine generator, where the power generating system is connected to an electrical power grid for supplying power to the electrical power grid, and wherein the electrical storage unit is electrically connected with the power generating system and is controllable to charge or discharge dependent on a power set-point, wherein the method comprises:
  setting a frequency control period, wherein the electrical storage unit is scheduled to charge or discharge according to a first power set-point;
  at a start of the frequency control period, charging or discharging the electrical storage unit according to the first power set-point;
  in case a frequency of the power grid exceeds a first grid frequency located above or below a frequency threshold, resulting in a first frequency deviation within the frequency control period, determining a first power change of the power from the electrical storage unit based on the first frequency deviation;
  determining a second power set-point based on the determined first power change;
  providing the frequency support by controlling the electrical storage unit to charge or discharge according to the second power set-point;
  in case the frequency of the power grid exceeds a second grid frequency located above or below the first grid frequency, resulting in a second frequency deviation within the frequency control period:
    determining a second power change;
    determining a third power set-point based on the second power change; and
    providing the frequency support by controlling the electrical storage unit to reverse charging to discharging the electric storage unit, or vice versa, according to the third power set-point.

2. The method of claim 1, wherein a maximum value of the second power change is given by a sum of the first power set-point and a nominal charging or discharging power of the electrical storage unit.

3. The method of claim 1, wherein providing the frequency support is conditioned on a level of a state of charge of the electrical storage unit.

4. The method of claim 1, wherein setting the frequency control period comprises at least one of:
  scheduling the electrical storage unit to charge according to the first power set-point and scheduling the electrical storage unit to discharge within the frequency control period in case the first or second frequency deviation indicates an under frequency of the grid; or
  scheduling the electrical storage unit to discharge according to the first power set-point and scheduling the electrical storage unit to charge within the frequency control period in case the first or second frequency deviation indicates an over frequency of the grid.

5. The method of claim 1, comprising:
forecasting a period of time wherein the power plant is capable of generating a plant production power which is higher than a planned required plant production power; and
setting the frequency control period within the forecasted period of time, wherein the electrical storage unit is scheduled to charge according to the first power set-point.

6. The method of claim 1, comprising:
forecasting a period of time wherein the power plant is scheduled to generate a plant production power which is lower than a planned required plant production power; and
setting the frequency control period within the forecasted period of time, wherein the electrical storage unit is scheduled to discharge according to the first power set-point.

7. The method of claim 1, comprising supplementing the first power change with a generator power change of power generated by the power generating system.

8. The method of claim 7, wherein the supplementation of the first power change with the generator power change is invoked in case a power change of the electrical storage unit is insufficient for achieving the first power change.

9. A central controller for controlling a power plant for providing frequency support to a power grid, the power plant comprises an electrical storage unit and a power generating system comprising one or more of power generating units including at least one wind turbine generator, where the power generating system is connected to an electrical power grid for supplying power to the electrical power grid, and wherein the electrical storage unit is electrically connected with the power generating system and is controllable to charge or discharge dependent on a power set-point, and where the central controller is configured to perform an operation, comprising:
  setting a frequency control period, wherein the electrical storage unit is scheduled to charge or discharge according to a first power set-point;
  at a start of the frequency control period, charging or discharging the electrical storage unit according to the first power set-point;
  in case a frequency of the power grid exceeds a first grid frequency located above or below a frequency threshold, resulting in a first frequency deviation within the frequency control period, determining a first power change of the power from the electrical storage unit based on the first frequency deviation;
  determining a second power set-point based on the determined first power change; and
  providing the frequency support by controlling the electrical storage unit to charge or discharge according to the second power set-point;
  in case the frequency of the power grid exceeds a second grid frequency located above or below the first grid frequency, resulting in a second frequency deviation within the frequency control period:
    determining a second power change;
    determining a third power set-point based on the second power change; and
    providing the frequency support by controlling the electrical storage unit to reverse charging to discharging the electric storage unit, or vice versa, according to the third power set-point.

10. A non-transitory computer program product comprising software code adapted to control a power plant which, when executed on a data processing system, performs an operation of providing frequency support to a power grid, the power plant comprises an electrical storage unit and a power generating system comprising one or more of power generating units including at least one wind turbine generator, where the power generating system is connected to an electrical power grid for supplying power to the electrical power grid, and wherein the electrical storage unit is electrically connected with the power generating system and is controllable to charge or discharge dependent on a power set-point; wherein the operation, comprises:
  setting a frequency control period, wherein the electrical storage unit is scheduled to charge or discharge according to a first power set-point;
  at a start of the frequency control period, charging or discharging the electrical storage unit according to the first power set-point;
  in case a frequency of the power grid exceeds a first grid frequency located above or below a frequency threshold, resulting in a first frequency deviation within the frequency control period, determining a first power change of the power from the electrical storage unit based on the first frequency deviation;
  determining a second power set-point based on the determined first power change; and
  providing the frequency support by controlling the electrical storage unit to charge or discharge according to the second power set-point;
  in case the frequency of the power grid exceeds a second grid frequency located above or below the first grid frequency, resulting in a second frequency deviation within the frequency control period:
    determining a second power change;
    determining a third power set-point based on the second power change; and
    providing the frequency support by controlling the electrical storage unit to reverse charging to discharging the electric storage unit, or vice versa, according to the third power set-point.

* * * * *